United States Patent [19]
Hiroki

[11] Patent Number: 5,976,667
[45] Date of Patent: *Nov. 2, 1999

[54] MAGNETO-OPTICAL RECORDING MEDIUM UTILIZING MAGNETOSTATIC COUPLING, AND METHOD OF RECORDING INFORMATION ON THE MEDIUM

[75] Inventor: Tomoyuki Hiroki, Zama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/682,013

[22] Filed: Jul. 16, 1996

[30] Foreign Application Priority Data

Jul. 18, 1995 [JP] Japan .................................... 7-181692

[51] Int. Cl.$^6$ ....................................................... G11B 5/66
[52] U.S. Cl. .......................... 428/141; 428/156; 428/163; 428/164; 428/694 ML; 428/694 MT; 428/694 MM; 428/694 EC; 428/694 IS; 428/900; 369/13
[58] Field of Search ...................... 369/13; 428/694 ML, 428/694 MT, 694 MM, 694 EC, 694 IS, 141, 156, 163, 164, 900

[56] References Cited

FOREIGN PATENT DOCUMENTS

| 586122 | 3/1994 | European Pat. Off. . |
|---|---|---|
| 586175 | 3/1994 | European Pat. Off. . |
| 596716 | 5/1994 | European Pat. Off. . |
| 3-219449 | 9/1991 | Japan . |

*Primary Examiner*—Leszek Kiliman
*Attorney, Agent, or Firm*—Fitzpatrick, Cella, Harper & Scinto

[57] ABSTRACT

A magneto-optical recording medium includes at least a reproduction layer and a memory layer on a substrate on which a groove and a land is formed. Information is reproduced from the magneto-optical recording medium by transferring magnetization information recorded in the memory layer to the reproduction layer by magnetostatic coupling. Prior to recording of information, the magneto-optical recording medium is initialized such that a magnetization of the memory layer on the land is aligned in one direction and a magnetization of the memory layer on the groove is aligned in a direction opposite to the one direction.

9 Claims, 11 Drawing Sheets

DIRECTION OF MAGNETIZATION

R = 0.4 μm
h = 30 nm
z = 30 nm (GRAPH (a) IN FIG. 2C)

FIG. 2B PRIOR ART

ML = 1.6 μm
W = 0.8 μm
z = 30 nm (GRAPH (b) IN FIG. 2C)

TEMPERATURE DISTRIBUTION IN TRACK CENTER

TEMPERATURE DISTRIBUTION IN TRACK CENTER

DIRECTION OF MAGNETIZATION

MAGNETO-OPTICAL RECORDING MEDIUM UTILIZING MAGNETOSTATIC COUPLING, AND METHOD OF RECORDING INFORMATION ON THE MEDIUM

BACKGROUND OF THE INVENTION

1. Field of the Invention

The present invention relates to a magneto-optical recording medium on and from which information is optically recorded and reproduced using a light beam, and a method of recording information on the medium.

2. Related Background Art

As conventional media used for optically recording/reproducing information, a ROM (read-only) type medium, a WORM (write once, read many) type medium, an R/W (rewritable) type medium, and the like are known. These media use a transparent material, such as glass or polycarbonate, as a substrate, and are distinguished from each other depending on the material used to form a coating or a film on the substrate. That is, when a substance such as Al having high reflectance and thermal stability is used on the substrate, a ROM type medium is obtained. When a material, such as an organic dye that causes an irreversible reaction due to heat is used, a WORM type medium is obtained. Also, when a material such as a magnetic material or a phase change material (which can assume both crystalline and amorphous states), which can thermally or magnetically cause a reversible reaction, is used, an R/W type medium is obtained.

On the other hand, when optical information recording media are classified in terms of their shapes, they can be roughly classified into a disc type medium, a card type medium, and a tape type medium. These media have respective features and are selectively used depending on application. Of these types of media, the disc type medium is most popular since it can realize high-speed information transfer.

Figure 1:
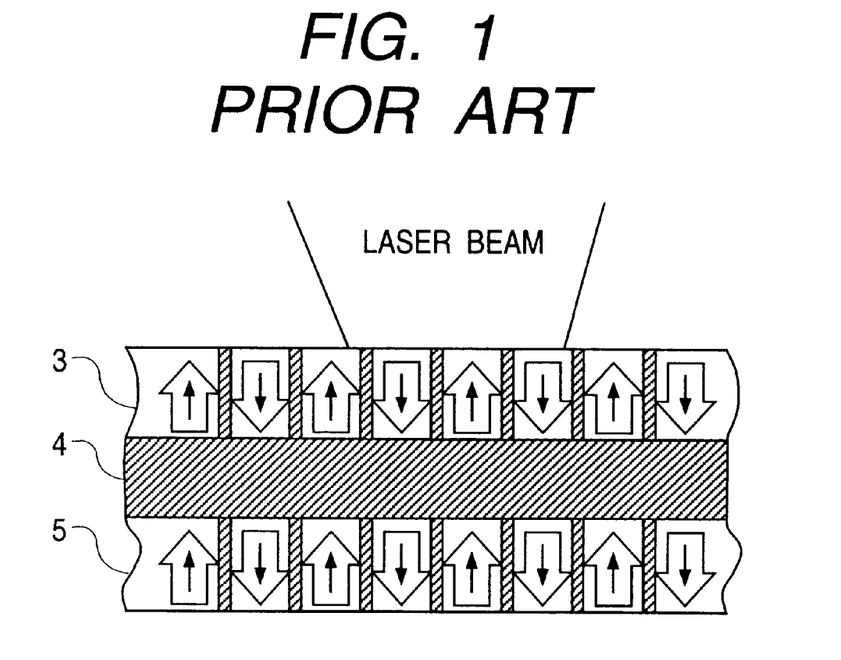
FIG. 1 is a sectional view of a conventional magneto-optical recording medium.

FIG. 1 shows an example of a magneto-optical recording medium as a conventional R/W type optical disc. The medium mainly comprises a first magnetic layer 3 (to be referred to as a reproduction layer hereinafter), an intermediate layer 2, and a second magnetic layer 5 (to be referred to as a memory layer hereinafter). The memory layer 5 is a film such as TbFeCo, DyFeCo, or the like having a large perpendicular magnetic anisotropy, and recording information is held by forming magnetic domains depending on whether the direction of magnetization of this film is upward or downward with respect to the film surface. The reproduction layer 3 is a film, such as GdFeCo, having a small coercive force and a high Curie temperature. The intermediate layer 4 consists of a dielectric, such as SiN, and is arranged to magnetostatically couple the memory layer 5 and the reproduction layer 3. Information reproduction is attained by detecting magnetic domains transferred from the memory layer 5 to the reproduction layer 3 by the magnetostatic coupling force using a reading laser beam. Even when the reproduction layer and the intermediate layer are omitted (the memory layer alone), information may be recorded/reproduced. However, in this case, high recording sensitivity and high signal quality are hardly accomplished at the same time. More specifically, in the above-mentioned prior art, a material that allows information recording with low power is selected for the memory layer 5, and a material that allows information reproduction with a high CNR is selected for the reproduction layer 3.

Figure 2A:
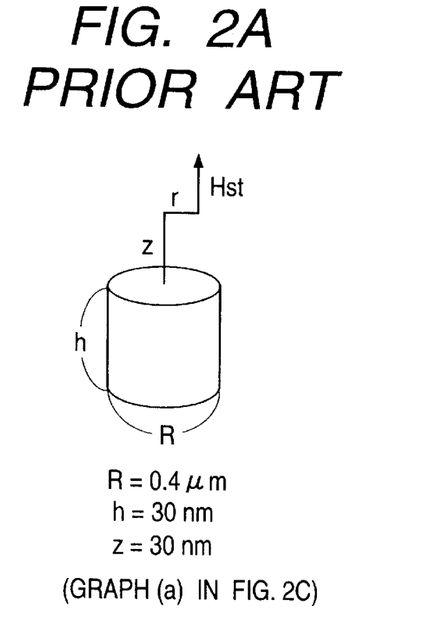
FIGS. 2A to 2C are respectively perspective views and a graph for explaining a change in magnitude of a static magnetic field depending on the size of a recording magnetic domain.
Figure 2B:
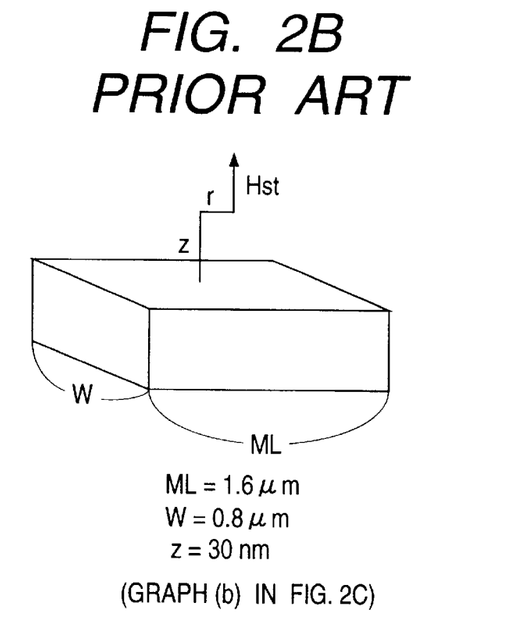

However, in the above-mentioned prior art, when the memory layer and the reproduction layer are magnetostatically coupled to each other, different magnetostatic forces are generated depending on the sizes of recording marks. This problem will be explained below with reference to FIGS. 2A to 2C.

Figure 2C:
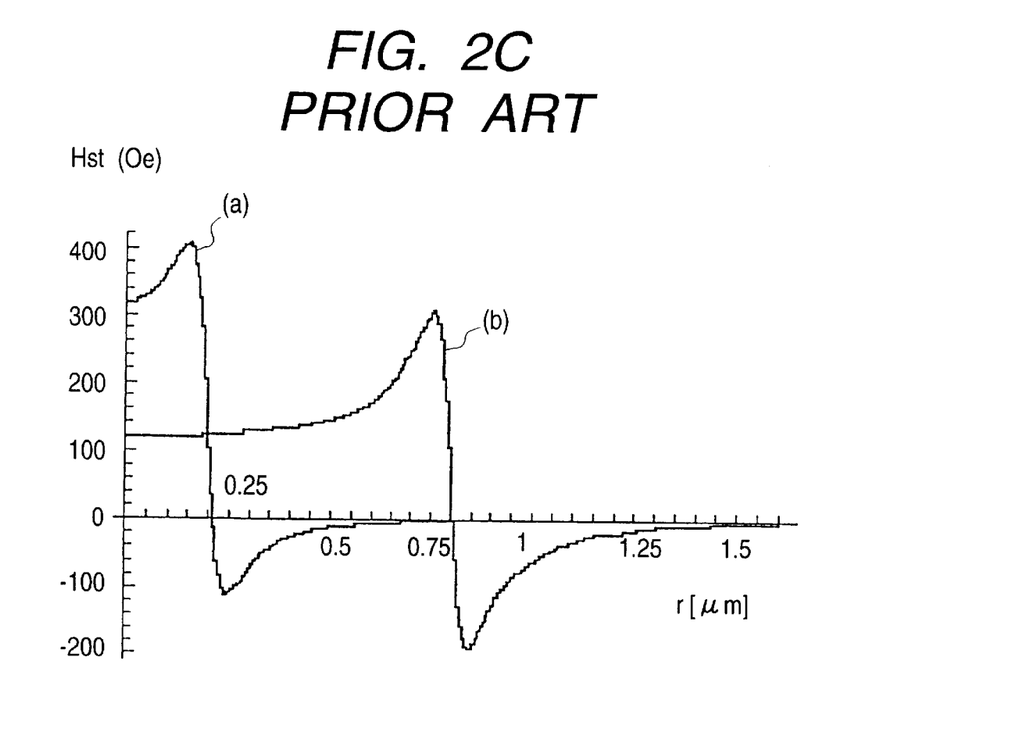

FIG. 2C shows the calculation results of the magnitudes, $H_{st}$, of static magnetic fields generated by a circular magnetic domain and a rectangular magnetic domain. A graph (a) represents the strength of the static magnetic field 30 nm above a cylindrical magnetic domain having a diameter of 0.4 $\mu$m, a thickness of 30 nm, and a saturation magnetization of 200 emu/cc. As can be seen from the graph (a), a static magnetic field of about 300 Oe is present near the center of the magnetic domain although it has a peak near the magnetic wall. In contrast to this, in the case of a rectangular parallelopiped magnetic domain having a size of 1.6×0.8 $\mu$m, a thickness of 30 nm, and a saturation magnetization of 200 emu/cc, as shown in a graph (b), the static magnetic field generated is weak as a whole and only a static magnetic field as low as about 100 Oe acts near the center of the magnetic domain. For this reason, the transfer characteristics of magnetic domains from the memory layer to the reproduction layer are impaired, and stability against an external magnetic field is low.

SUMMARY OF THE INVENTION

The present invention has been made in consideration of the above-mentioned problems and has as its object to provide a magneto-optical recording medium which has good transfer characteristics of magnetic domains from a memory layer to a reproduction layer, and high stability against an external field, and a method of recording information on the medium.

In order to achieve the above object, there is provided a magneto-optical recording medium, which is constituted by stacking at least a reproduction layer and a memory layer on a substrate on which a groove and a land are formed, and from which information is reproduced by transferring magnetization information recorded in the memory layer to the reproduction layer by magnetostatic coupling, characterized in that the medium is initialized so that the land and groove have opposite directions of magnetization.

In order to achieve the above object, there is also provided an information recording method for recording information on a magneto-optical recording medium, which is constituted by stacking at least a reproduction layer and a memory layer on a substrate on which a groove and a land are formed, and from which information is reproduced by transferring magnetization information recorded in the memory layer to the reproduction layer by magnetostatic coupling, comprising the step of:

executing, prior to the information recording, initialization for aligning a magnetization of the memory layer on the land in one direction, and aligning the magnetization of the memory layer on the groove in a direction opposite to the one direction.

The above and other objects will become apparent from the following description of the embodiments.

DETAILED DESCRIPTION OF THE PREFERRED EMBODIMENTS (First Embodiment)

The first embodiment of the present invention will be described in detail hereinafter with reference to the accompanying drawings.

Figure 3:
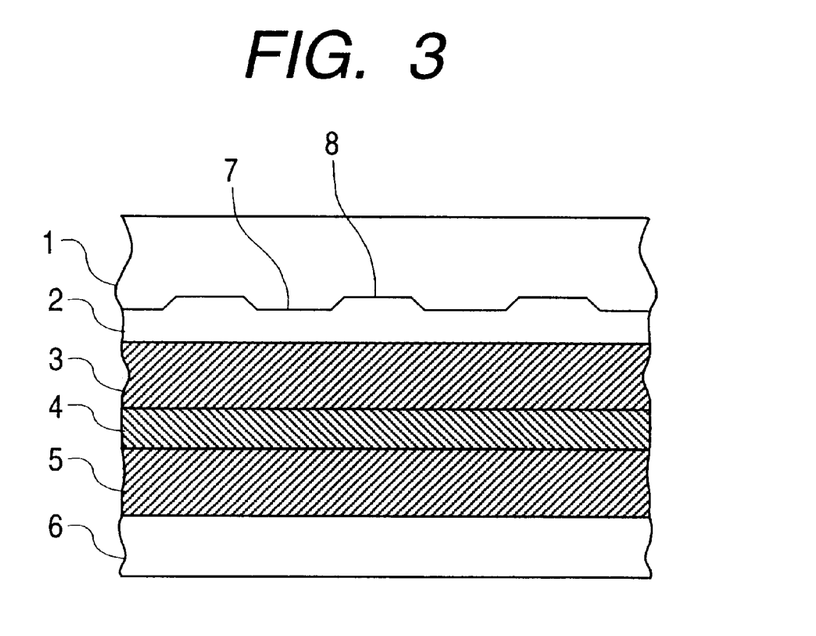
FIG. 3 is a sectional view of a magneto-optical recording medium according to the first embodiment of the present invention.

FIG. 3 is a sectional view of an optical disc in this embodiment. As shown in FIG. 3, in the optical disc used in this embodiment, an interference layer 2, a first magnetic layer (to be referred to as a reproduction layer hereinafter) 3, a dielectric layer (to be referred to as an intermediate layer hereinafter) 4, a second magnetic layer (to be referred to as a memory layer hereinafter) 5, and a protection layer 6 are stacked on a substrate 1 in the order named. The substrate 1 normally consists of a transparent material such as glass, polycarbonate, or the like, and lands and grooves serving as guide grooves of information tracks are formed on the substrate 1. The respective layers stacked on the substrate 1 can be formed by continuous sputtering using a magnetron sputtering apparatus, continuous deposition, and the like. The interference layer 2 is formed to improve the magneto-optical effect, and consists of a transparent dielectric material such as $Si_3N_4$, AlN, $SiO_2$, SiO, ZnS, $MgF_2$, or the like. The protection layer 6 is used for protecting the magnetic layers, and consists of the same material as that of the interference layer 2. Since the interference layer 2 and the protection layer 6 are not related to the essence of the present invention, they may be omitted in terms of the structure, and a detailed description thereof will be omitted. Although not shown, the protection layer 6 may be further coated with a hard coat material, such as an ultraviolet setting resin so as to protect the layers.

The memory layer 5 holds recording information, and must be able to stably hold magnetic domains as very small as 1 $\mu$m or less. As the material of the memory layer 5, a material which has large perpendicular magnetic anisotropy and can stably hold the magnetization state, i.e., a rare earth-iron group amorphous alloy such as TbFeCo, DyFeCo, TbDyFeCo, or the like, garnet, a platinum group-iron group periodic structure film (e.g., Pt/Co or Pd/Co), a platinum group-iron group alloy (e.g., PtCo or Pd/Co), or the like may be used. By "iron group" is here meant the elements iron, cobalt, and nickel. By "platinum group" is here meant the elements Ru, Rh, Pd, Os, Ir and Pt. The memory layer 5 preferably has a Curie temperature of 280° C. or less and more preferably, 240° C. or less, since the Curie temperature is directly related to laser power required for recording information, and the recording sensitivity is impaired if it is too high.

The reproduction layer 3 is used for reproducing magnetization information held in the memory layer 5, and is located on the side nearer incident light than the memory layer 5. The reproduction layer 3 preferably has a Curie temperature of 270° C. or higher, which is higher than that of the memory layer 5, and more preferably, 300° C. or higher, so as to prevent the Kerr rotation angle from deteriorating upon reproduction. The reproduction layer 3 preferably consists of a rare earth-iron group element amorphous alloy having small perpendicular magnetic anisotropy, and more particularly, GdFeCo. A light rare earth metal such as Nd, Pr, Sm, or the like may be added to the above-mentioned material so as to increase the Kerr rotation angle at the short wavelength side.

An element such as Al, Ti, Pt, Nb, Cr, or the like may be added to the reproduction layer 3 and the memory layer 5 so as to improve the corrosion resistance. Also, a layer with good heat conductivity such as Al, AlTa, AlTi, AlCr, Cu, or the like may be formed to improve the heat conductivity between the memory layer 5 and the protection layer 6.

The intermediate layer 4 is a dielectric layer which is arranged for the purpose of shielding exchange coupling between the memory layer 5 and the reproduction layer 3 and magnetostatically coupling these layers, and preferably consists of the same material as that of the interference layer 2 and the protection layer 6 so as to simplify the manufacturing apparatus. Due to the presence of this layer, the memory layer 5 and the reproduction layer 3 are coupled by only magnetostatic coupling.

Figure 4:
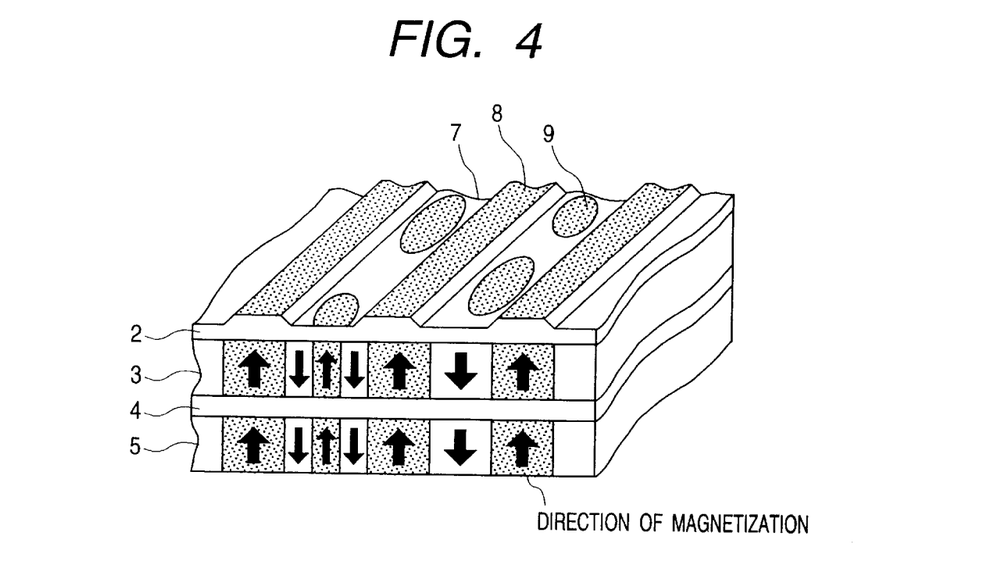
FIG. 4 is a view showing the magnetization state of the medium of the present invention shown in FIG. 1.

FIG. 4 shows the directions of magnetization of the respective magnetic layers in this embodiment. In FIG. 4, white portions have downward magnetization, gray portions have upward magnetization, magnetic domains recorded on lands have upward magnetization, and the surrounding portions of the magnetic domains have downward magnetization. Grooves uniformly have upward magnetization, i.e., have a direction of magnetization opposite to that of erased portions (or blank portions) on the lands.

With this orientation of magnetization, as shown in FIG. 4, the transfer characteristics of magnetic domains from the memory layer to the reproduction layer can be improved. The reason for this improvement will be explained below with reference to FIGS. 5A to 5C and FIGS. 6A to 6C.

Figure 5A:
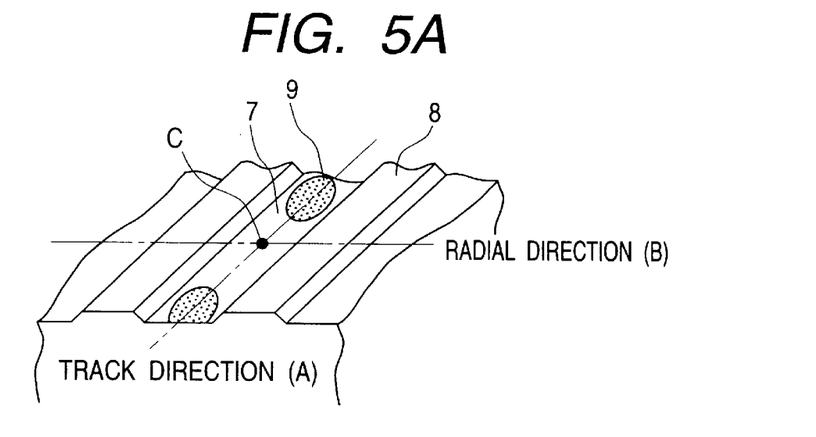
FIGS. 5A to 5C are respectively a perspective view and graphs & sectional views showing the magnitude of a static magnetic field in a conventional medium.
Figures 5B, 5C:
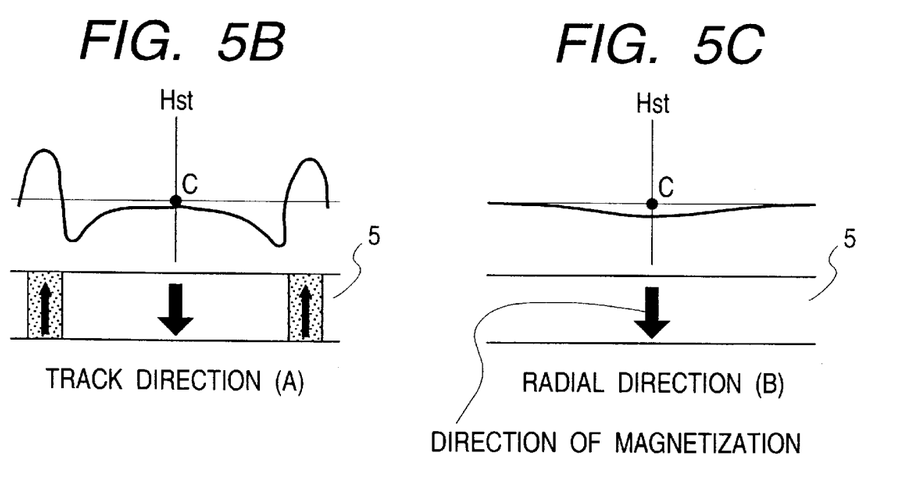

FIGS. 5A to 5C show the prior art, i.e., a case wherein the blank portion on a land has the same direction of magnetization as that of grooves. A case will be examined below wherein relatively small marks are recorded on the land of such disc to be separated by a relatively large interval. As shown in FIG. 5B which is a sectional view of the memory layer taken along a line A indicating the center of a track in FIG. 5A and is a graph showing the magnitude of a static magnetic field generated by the magnetic layer, the magnitude of the static magnetic field is large on a mark and becomes small between adjacent marks (in particular, near a middle point C). As can be seen from FIG. 5C in the radial direction, the static magnetic field generated from a blank portion between adjacent recording marks becomes smaller as the blank portion becomes larger and as the position becomes closer to the blank center. Therefore, in the case of the prior art, although recording marks recorded on the memory layer 5 are transferred to the reproduction layer 3, since the blank portion other than the marks has a weak magnetostatic coupling force and low transfer characteristics, a maze is easily formed on the reproduction layer corresponding to this portion, and the transfer characteristics decrease especially upon application of an external magnetic field.

Figure 6A:
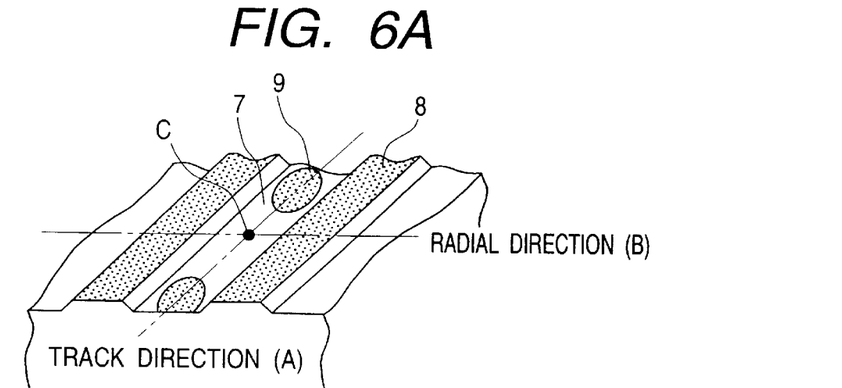
FIGS. 6A to 6C are respectively a perspective view and graphs & sectional views showing the magnitude of a static magnetic field in the medium of the present invention.
Figure 6B:
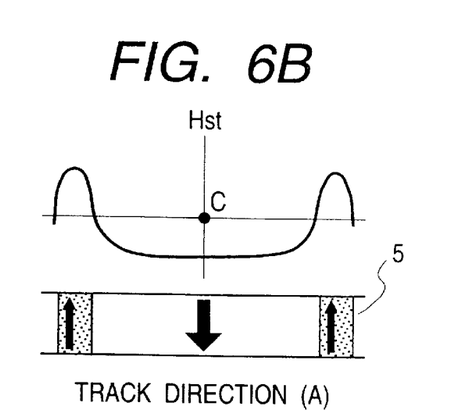
Figure 6C:
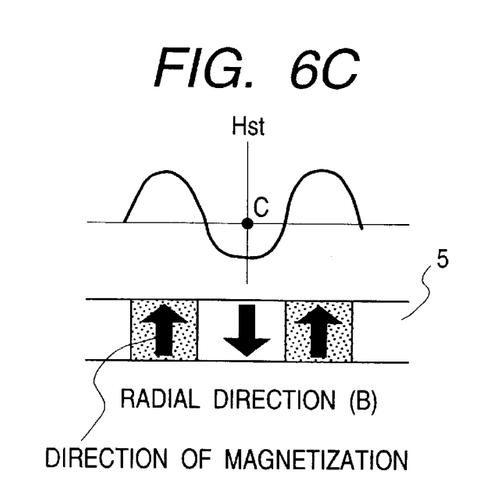

In contrast to this, in this embodiment, as shown in FIG. 6A, the direction of magnetization on grooves is set to be opposite to that of the blank portion on a land. In this case, the static magnetic field in the track direction is the same as that shown in FIG. 5B. However, the static magnetic field in the radial direction is equivalent to that obtained when very small marks are aligned, as shown in FIG. 6C. As a result, since the neighboring grooves have a direction of magnetization opposite to that of the blank portion, a static magnetic field strong enough to transfer magnetic domains can be generated even at a position near the blank center. More specifically, since the magnetostatic coupling force between the memory layer 5 and the reproduction layer 3 increases, the signal quality can be improved, and a signal can be prevented from being disturbed by any external magnetic field.

In order to realize the magnetization state of this embodiment in practice, an operation similar to a normal erase operation can be performed for both lands and grooves. More specifically, tracking servo is performed on lands while applying an external magnetic field in a predetermined direction (erasure side), and the laser power is increased so that the temperature of the memory layer reaches a temperature near its Curie temperature. In this state, the entire perimeter of the disc is traced, thus completing the erasure operation for aligning the magnetization of the lands in one direction. Subsequently, the polarity of tracking servo is inverted, and the tracking servo is performed on grooves. The direction of the external magnetic field is set to be opposite to that in the case of the lands, and the laser power is increased up to erasure power. By performing the erasure operation over the entire perimeter of the disc, a medium like in this embodiment can be realized.

This operation is required only once from when the disc is manufactured until information is recorded for the first time (e.g., immediately before the recording operation). Thereafter, the magnetization state of the present invention can be maintained by performing recording/reproduction according to a normal procedure.

Figure 7:
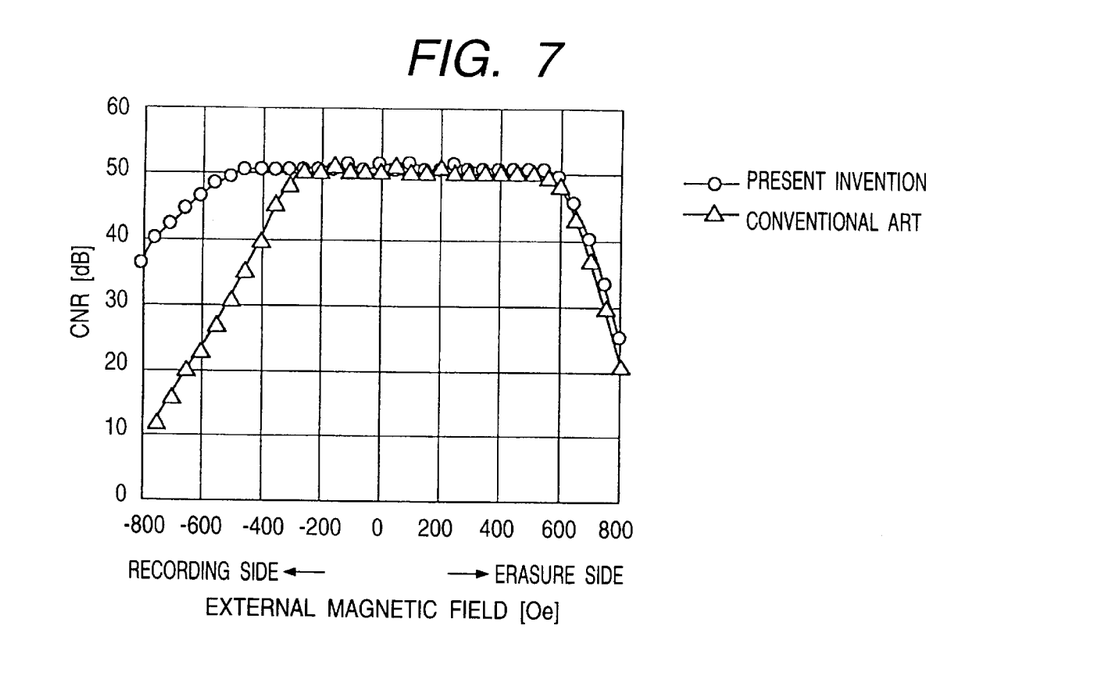
FIG. 7 is a graph showing the external magnetic field stability of the medium of the present invention.

FIG. 7 shows the measurement result of external magnetic field stability upon recording of 0.8-μm long marks on a magneto-optical recording medium of this embodiment. Even in the conventional medium in which the grooves and lands are erased in the same direction, in the absence of an external magnetic field, a sufficiently high CNR (about 50 dB) can be obtained. However, as can be seen from FIG. 7, when an external magnetic field is applied, the conventional medium is especially weak against the magnetic field on the recording side, and magnetic domains cannot be stably transferred on a blank portion between recording marks. In contrast to this, as can be seen from FIG. 7, when the direction of magnetization of grooves is set to be opposite to that of the blank portion of lands, stability even against the external magnetic field on the recording side can be improved, and a high CNR can be obtained for the magnetic field as high as that on the erasure side.

As described above, according to the present invention, on portions where magnetic domains are formed and other portions, the magnetostatic coupling force acting between the memory layer and the reproduction layer can be increased, and consequently, high transfer characteristics can be obtained independently of the recording pattern. Therefore, the reproduction signal quality and stability against the external magnetic field can be improved.

(Second Embodiment)

The second embodiment of the present invention will be described below with reference to FIGS. 8A to 10.

Figure 8A:
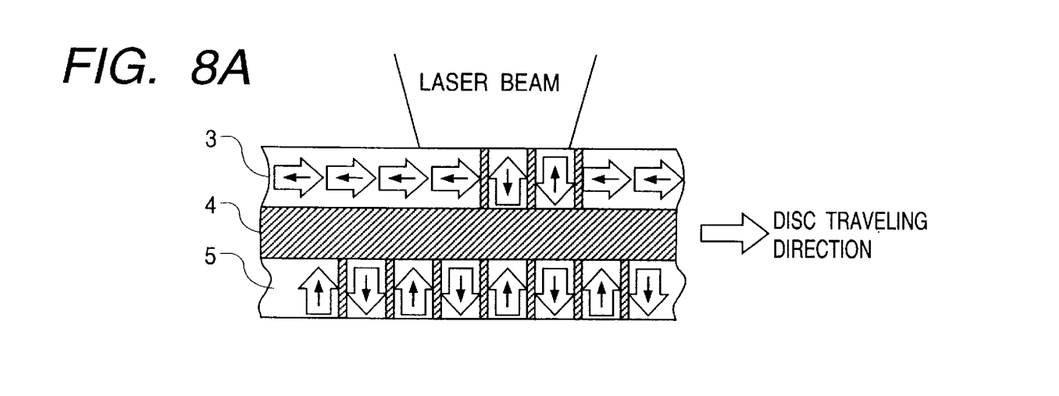
FIGS. 8A to 8C are respectively a sectional view, a plan view, and a graph showing a magneto-optical recording medium according to the second embodiment of the present invention.
Figure 8B:
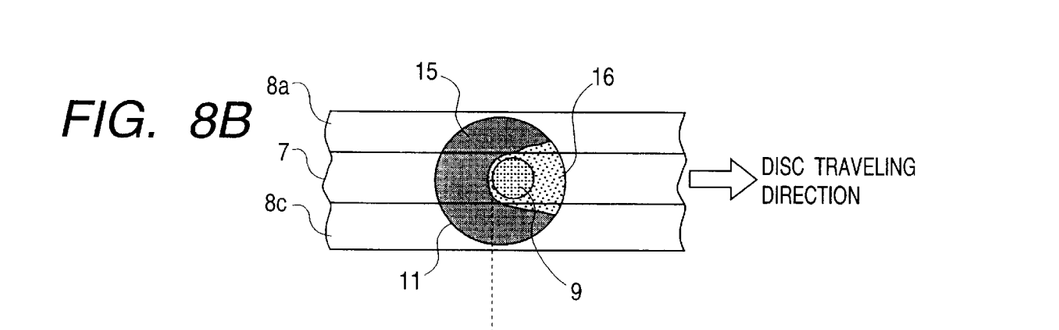

A magneto-optical recording medium of this embodiment allows reproduction of very small marks smaller than the diffraction limit of reproduction light by performing super-resolution reproduction in such a manner that the reproduction layer 3 is controlled to make a transition from an in-plane magnetization film to a perpendicular magnetization film in accordance with a change in temperature, and an aperture 16 is formed in the reproduction layer 3 by utilizing the transfer of magnetic domains by means of magnetostatic coupling with the memory layer 5 and information is reproduced by only a portion in an information reproduction spot 11.

Figure 8C:
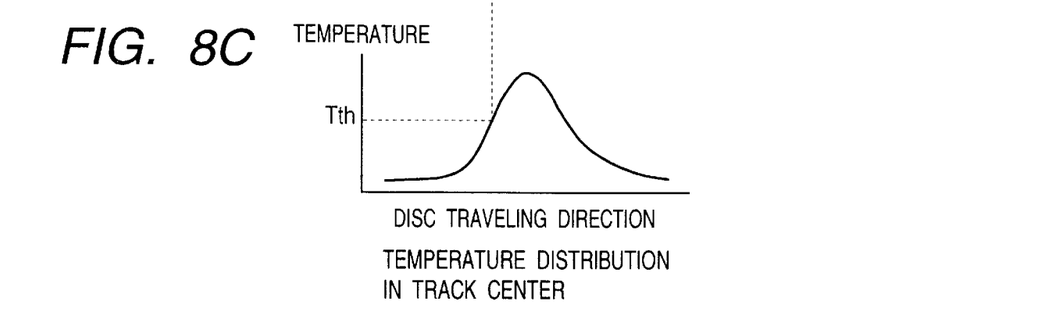

FIG. 8A shows the state of a spot and the magnetization states of the respective magnetic layers when an optical disc of this embodiment moves rightward in FIG. 8A while a laser beam irradiates the disc. In FIG. 8A, a solid arrow indicates the direction of iron group element sublattice magnetization, and an open arrow indicates the actual direction of magnetization. At this time, the disc moves at a speed of about 5 to 15 m/s, and a position where a maximum film temperature is obtained is present behind the center of the laser spot due to the heat accumulation effect of laser irradiation, as shown in FIG. 8C.

Figure 9:
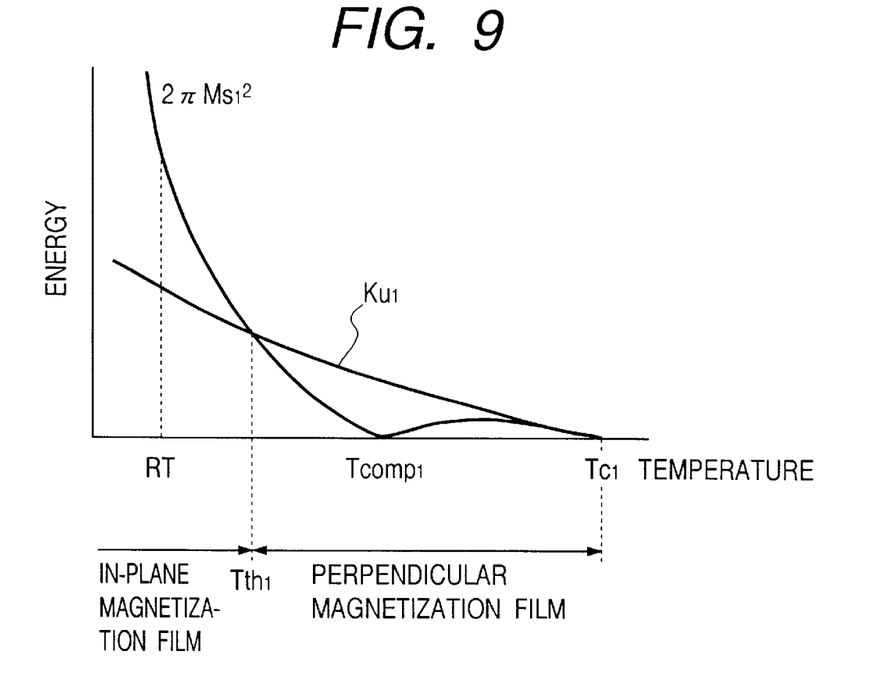
FIG. 9 is a graph showing the energy of a reproduction layer in the medium according to the second embodiment of the present invention.

FIG. 9 shows the temperature dependence of anisotropic energy of the reproduction layer 3. In this embodiment, since rare earth element sublattice magnetization is dominant and a saturation magnetization $M_{s1}$ is set to be relatively large at room temperature, the saturation magnetization abruptly decreases toward the compensation temperature present between room temperature and the Curie temperature, and hence, energy $2\pi M_{s1}^2$ for turning the direction of magnetization to the in-plane direction of the film also abruptly decreases from room temperature toward the compensation temperature. On the other hand, the perpendicular magnetic anisotropy $K_{u1}$ of the reproduction layer 3 slowly decreases from room temperature toward the Curie temperature. At this time, the relationship between the energy and the direction of magnetization of the reproduction layer is as follows. That is, when the following inequality holds, the reproduction layer 3 becomes an in-plane magnetization film:

$$2\pi M_{s1}^2 > K_{u1} \tag{1}$$

Figure 10:
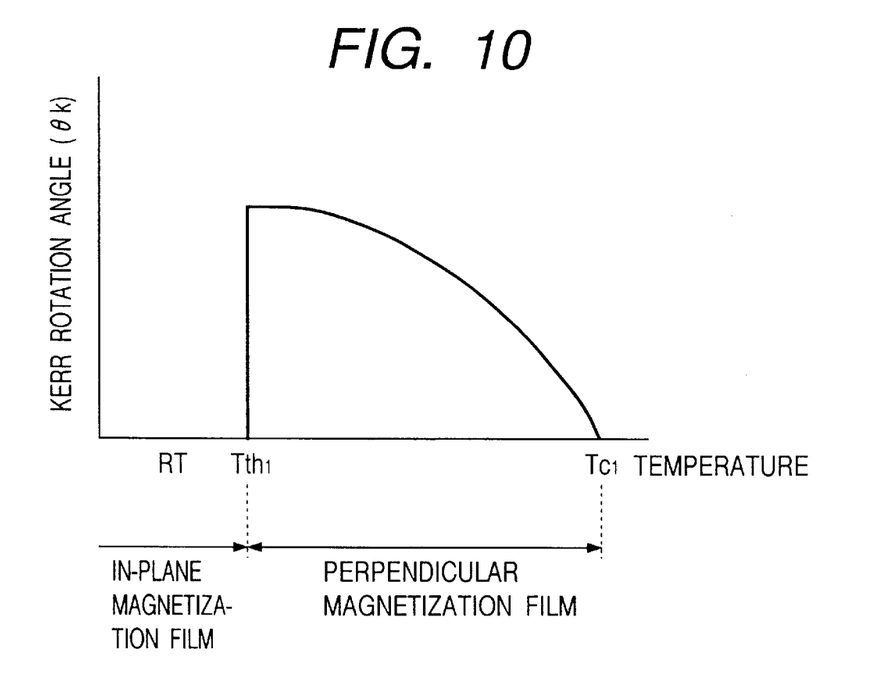
FIG. 10 is a graph showing the temperature dependence of the Kerr rotation angle of the reproduction layer in the medium according to the second embodiment of the present invention.

More specifically, when the temperature of the magnetic layer is increased, the magnetic layer makes a transition from an in-plane magnetization film to a perpendicular magnetization film to have a temperature $T_{th1}$ as a boundary, as shown in FIG. 9. FIG. 10 shows the temperature dependence of the Kerr rotation angle due to the polar Kerr effect of the reproduction layer 3. As shown in FIG. 10, since the reproduction layer 3 is an in-plane magnetization film at a temperature near room temperature, the Kerr rotation angle θk hardly appears. When the temperature of the reproduction layer 3 increases up to $T_{th1}$, the reproduction layer 3 makes a transition to a perpendicular magnetization film, and the Kerr rotation angle abruptly appears. Therefore, since the Kerr rotation angle is almost 0 in a temperature region equal to or lower than $T_{th1}$, the reproduction layer 3 does not contribute to information reproduction, and can be subjected to information reproduction due to the Kerr effect in a region higher than $T_{th1}$. For this reason, this reproduction layer is substantially equivalent to a layer which is subjected to information reproduction in only a small region equal to or higher than $T_{th1}$.

In the magneto-optical recording medium of this embodiment, in a portion where the reproduction layer 3 becomes a perpendicular magnetic film, magnetic domains in the memory layer 5 are transferred to the reproduction layer 3 by the magnetostatic coupling force. Therefore, as in the first embodiment, it is important to design the memory layer to generate a stable static magnetic field. For this purpose, it is very effective to set the direction of magnetization of the blank portion on the land to be opposite to that on the groove.

(Third Embodiment)

Figure 11A:
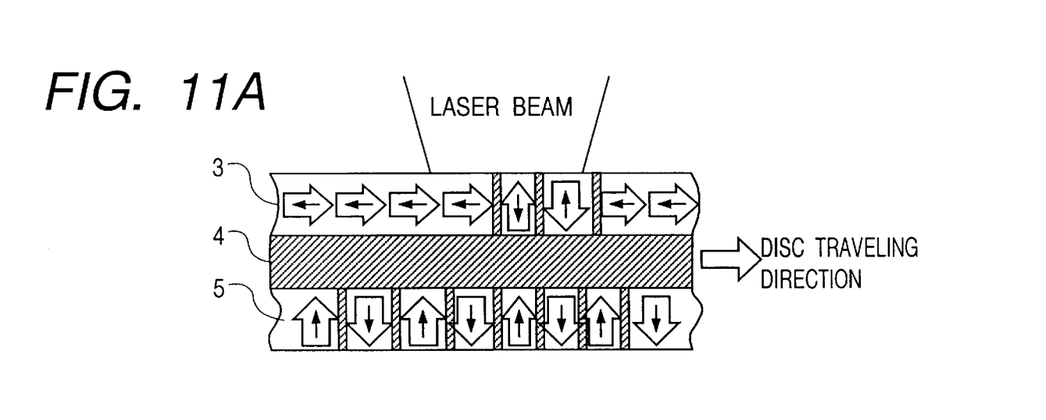
FIGS. 11A to 11C are respectively a sectional view, a plan view, and a graph showing a magneto-optical recording medium according to the third embodiment of the present invention.
Figure 11B:
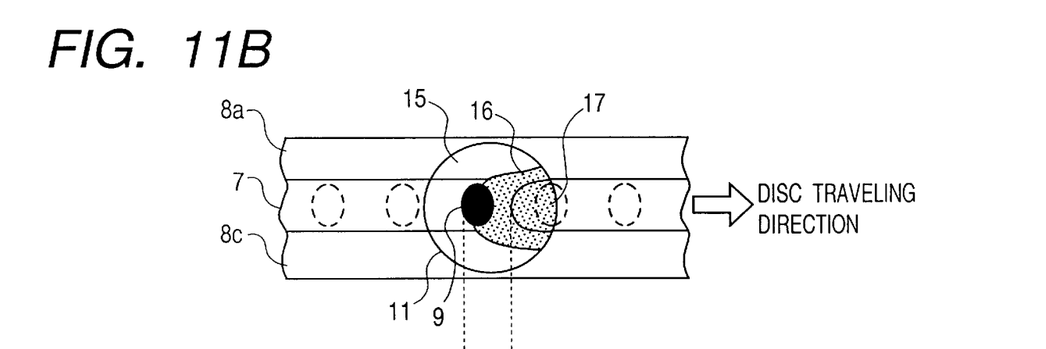

The third embodiment of the present invention will be described below with reference to FIGS. 11A to 12.

The arrangement of the medium of this embodiment is substantially the same as that in the second embodiment. The difference from the second embodiment lies in that a magnetic domain transferred to the reproduction layer disappears to form a rear mask when the temperature of the medium rises up to a predetermined temperature $T_{th2}$ or higher, thus realizing a double-mask type super-resolution structure. A phenomenon that a magnetic domain disappears in the rear mask will be explained below with reference to FIG. 12.

Figure 12:
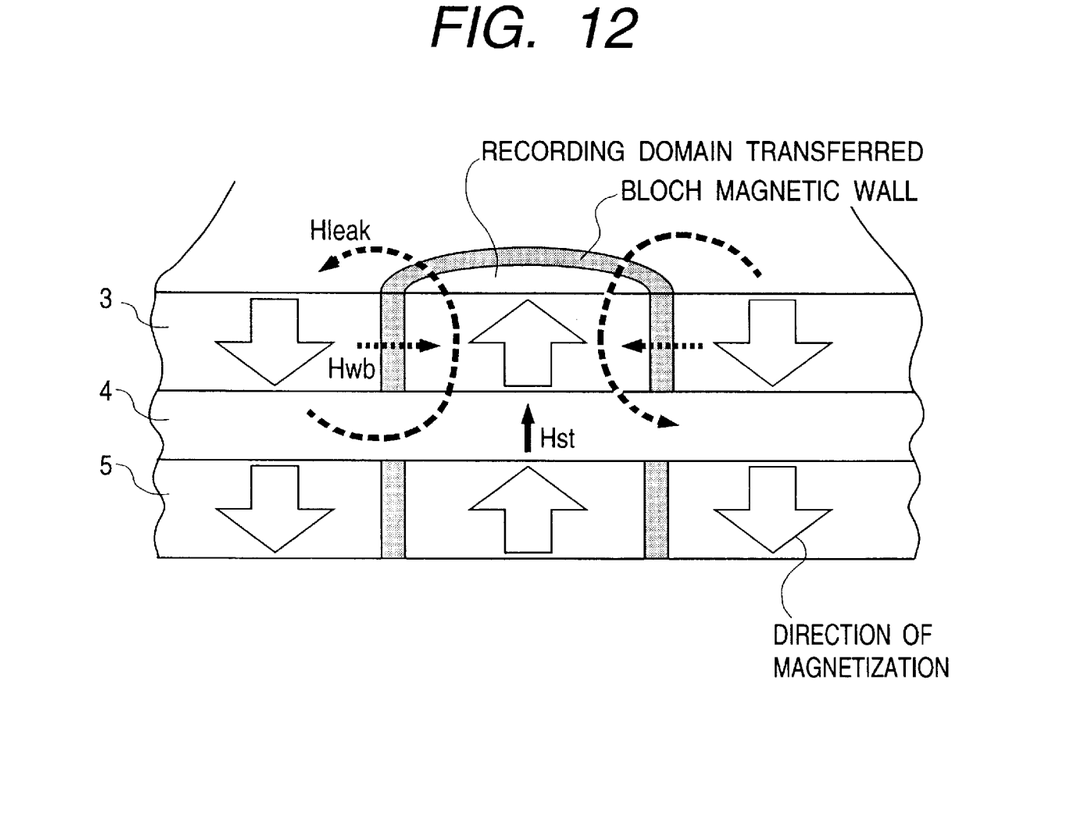
FIG. 12 is a sectional view showing the state of a magnetic field generated in a high-temperature portion in the medium according to the third embodiment of the present invention.

FIG. 12 shows a state wherein magnetic domains in the memory layer 5 are transferred to the reproduction layer 3. Three magnetic fields shown in FIG. 12 are applied to each transferred magnetic domain. In FIG. 12, a leak magnetic field $H_{leak}$ is generated by a magnetic domain, in the erasure direction, of the reproduction layer 3, and acts in a direction to promote transfer of a magnetic domain since a magnetic circuit is closed when the magnetic domain is transferred. A magnetic field $H_{wb}$ is generated by Bloch magnetic wall energy, and is given by:

$$H_{wb} = \sigma_{wb}/2M_{s1}r \tag{2}$$

where $\sigma_{wb}$ is the Bloch magnetic wall energy, and r is the radius of the magnetic domain. Since the Bloch magnetic wall energy is stable in terms of energy in a direction in which the volume of the Bloch magnetic wall is decreased, the magnetic field $H_{wb}$ acts in a direction to contract the transferred magnetic domain. In consideration of an energy balance between these magnetic fields and a static magnetic field $H_{st}$ from the memory layer 5, if the following inequality holds, a magnetic domain in the memory layer 5 is transferred to the reproduction layer 3 when the reproduction layer 3 makes a transition from an in-plane magnetization film to a perpendicular magnetization film while its temperature is rising:

$$H_{st} + H_{leak} > H_{wb} \tag{3}$$

On the contrary, if inequality (3) above does not hold, no recording magnetic field is transferred to the reproduction layer 3, and the magnetization of magnetic domains in the reproduction layer 3 uniformly aligns itself along the erasure direction irrespective of the direction of magnetization of the memory layer 5.

Figure 11C:
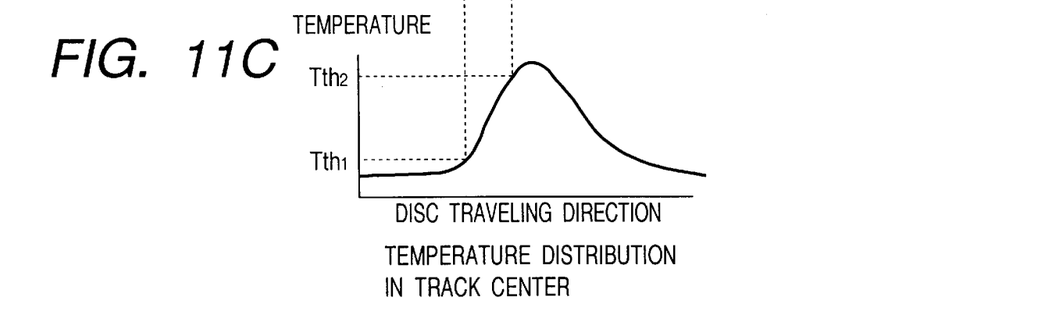

The temperature $T_{th2}$ shown in FIG. 11C is a boundary temperature below or above which inequality (3) above holds/does not hold. More specifically, in the temperature range from $T_{th1}$ to $T_{th2}$, the reproduction layer has perpendicular magnetization, and at the same time, it has a magnetic domain transferred thereto by magnetostatic coupling with the memory layer. When the temperature of the reproduction layer exceeds $T_{th2}$, the Bloch magnetic wall energy becomes dominant, and the reproduction layer can no longer hold a recording magnetic domain transferred from the memory layer. As a result, the magnetization of the magnetic domains uniformly aligns itself along the erasure direction. Thus, portions before and after the traveling direction of an aperture 16 are respectively masked by a front mask 15 and a rear mask 17.

In this embodiment as well, since the transfer of magnetic domains from the memory layer to the reproduction layer utilizes magnetostatic coupling, the direction of magnetization of a blank portion on each land is set to be opposite to that on each groove, thus realizing more stable information reproduction.

(Fourth Embodiment)

Figure 13A:
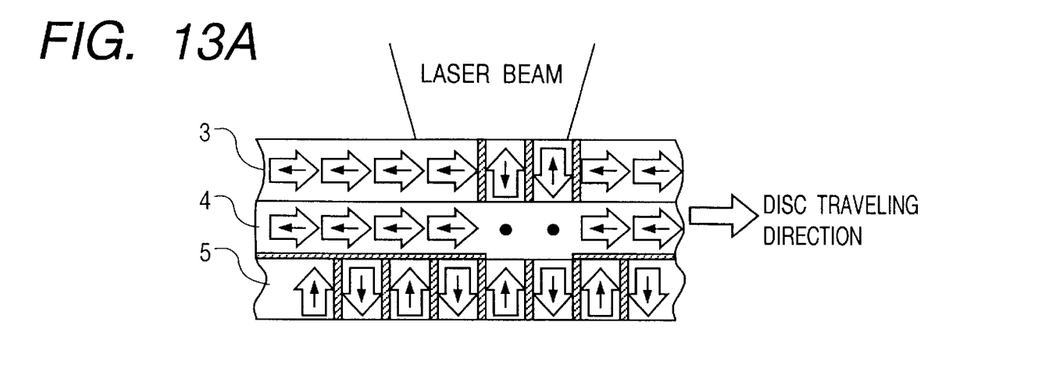
FIGS. 13A to 13C are respectively a sectional view, a plan view, and a graph showing a magneto-optical recording medium according to the fourth embodiment of the present invention.
Figure 13B:
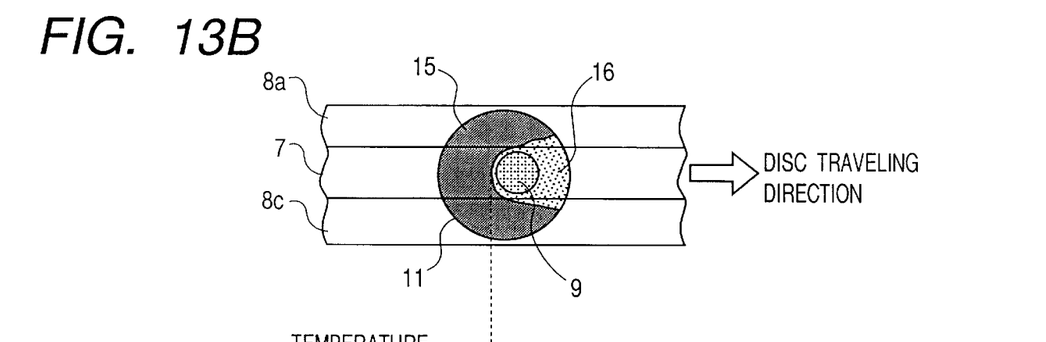

The fourth embodiment of the present invention will be described below with reference to FIGS. 13A to 13C.

The arrangement of the medium of this embodiment is substantially the same as that in the second embodiment, except that the intermediate layer consists of a magnetic member. The intermediate layer 4 consisting of the magnetic member has the following two effects.

(1) The intermediate layer 4 relaxes the interfacial magnetic wall energy between the reproduction layer 3 and the memory layer 5 within the temperature range from room temperature to a temperature near a Curie temperature $T_{c3}$ of the intermediate layer 4, and helps make the transition of the reproduction layer 3 to an in-plane magnetization film. This consequently contributes to reduction of the film thickness of the reproduction layer 3.

(2) In the temperature range equal to or higher than the Curie temperature $T_{c3}$ of the intermediate layer 4, the intermediate layer 4 cancels exchange coupling between the reproduction layer 3 and the memory layer 5.

In order to attain these effects, the Curie temperature $T_{c3}$ of the intermediate layer 4 is set to be higher than room temperature and to be lower than Curie temperatures $T_{c1}$ and $T_{c2}$ of the reproduction layer 3 and the memory layer 5. The Curie temperature $T_{c3}$ of the intermediate layer 4 is low enough to cancel the exchange coupling force by a beam spot having power as low as that for reproduction, and preferably falls within the range from 80° C. to 220° C. and more preferably, the range from 100° C. to 180° C. The intermediate layer 4 preferably consists of, for example, a rare earth-iron group amorphous alloy and, more particularly, GdFeCo. In order to lower the Curie temperature, a non-magnetic element such as Cr, Al, Si, Cu, or the like may be added.

Figure 13C:
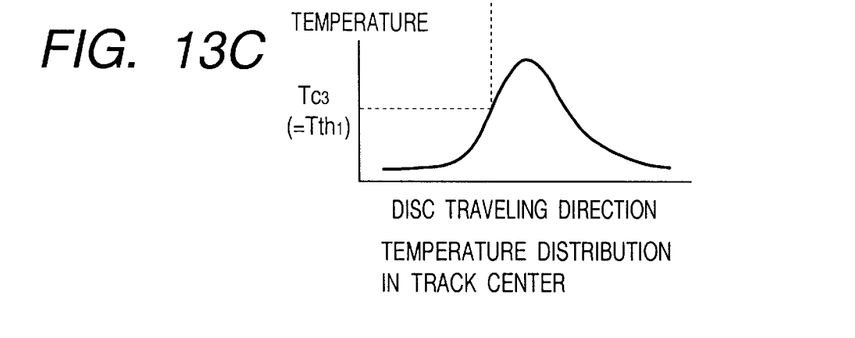

According to this embodiment, since the transition temperature $T_{th1}$ of the reproduction layer from an in-plane magnetization film to a perpendicular magnetization film is set to be a temperature close to the Curie temperature $T_{c3}$ of the intermediate layer, as shown in FIG. 13C, the reproduction layer 3 can be set in an in-plane magnetization state when its temperature is equal to lower than $T_{c3}$, and can form an aperture due to magnetostatic coupling when its temperature exceeds $T_{c3}$. Therefore, super-resolution reproduction of very small magnetic domains can be realized. In this case as well, the direction of magnetization of a blank portion on each land is set to be opposite to that on each groove to realize more stable information reproduction.

Also, in this embodiment, when a rear mask is formed based on the same principle as in the third embodiment using a high-temperature portion, a double-mask super-resolution structure may be realized.

(Fifth Embodiment)

Figure 14:
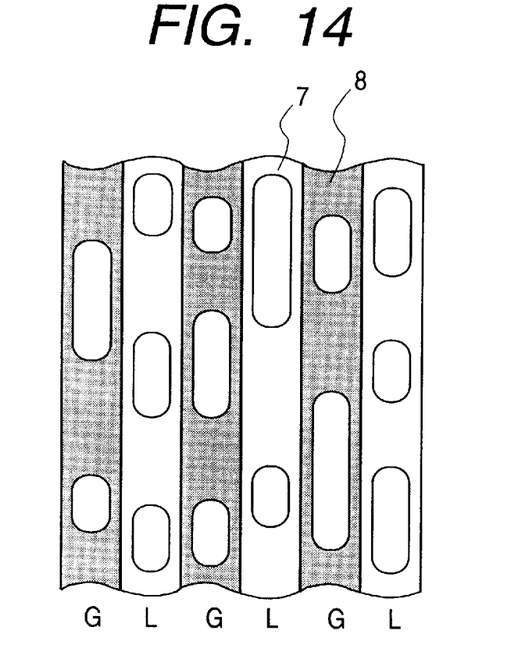
FIG. 14 is a plan view showing the magnetization state of a magneto-optical recording medium according to the fifth embodiment of the present invention.

The fifth embodiment of the present invention will be described below with reference to FIG. 14.

In this embodiment, information recording is performed on both lands and grooves to increase the recording capacity of the optical disc. In this case as well, when the magnetization is set to uniformly align along the erasure direction on the entire disc surface, coupling is weakened in the blank portion depending on the recording pattern. Therefore, the directions of magnetization of blank portions on lands and grooves are set to be opposite to each other, and the directions of an external magnetic field applied upon recording are set to be opposite to each other in correspondence with the lands and grooves, thus attaining recording shown in FIG. 14. With this recording method, since the size of a magnetic domain is limited even in the blank portion irrespective of the recording pattern, stable magnetostatic coupling and information reproduction can be realized on both the lands and grooves.

Note that this embodiment can be applied to the film arrangements described in all the first to fourth embodiments. In particular, when the film arrangement described in the second to fourth embodiments is adopted, not only very small magnetic domains can be reproduced, but also crosstalk from neighboring tracks can be suppressed due to the mask effect of an in-plane magnetization film. Therefore, this film arrangement is more preferable in this embodiment.

(Sixth Embodiment)

The sixth embodiment of the present invention will be described below with reference to FIG. 15.

In the medium structure of this embodiment, a fourth magnetic layer (to be referred to as a recording assist layer hereinafter), a fifth magnetic layer (to be referred to as a control layer hereinafter), and a sixth magnetic layer (to be referred to as an initialization layer hereinafter) are stacked between the memory layer 5 and the protection layer 6. A four-layered magnetic layer structure including these layers and the memory layer realizes an overwrite function based on laser power intensity modulation described in, e.g., Japanese Laid-Open Patent Application No. 3-219449. More specifically, the magnetization of the initialization layer is set to uniformly align in a preparatory process, and upon recording the laser intensity is modulated using two values Ph and Pl (Ph>Pl) while applying an external magnetic field in a direction opposite to the direction of magnetization of the initialization layer. When the laser power is Ph, the magnetization of the memory layer aligns along the direction of the external magnetic field irrespective of the previously recorded information; when the laser power is Pl, the magnetization of the memory layer aligns along that of the initialization layer, thus allowing an overwrite operation. Upon comparison between marks recorded by this method and those recorded on the medium described in each of the above embodiments, the direction of the external magnetic field corresponds to the recording direction, and the direction of the initialization layer corresponds to the erasure direction.

Figure 15:
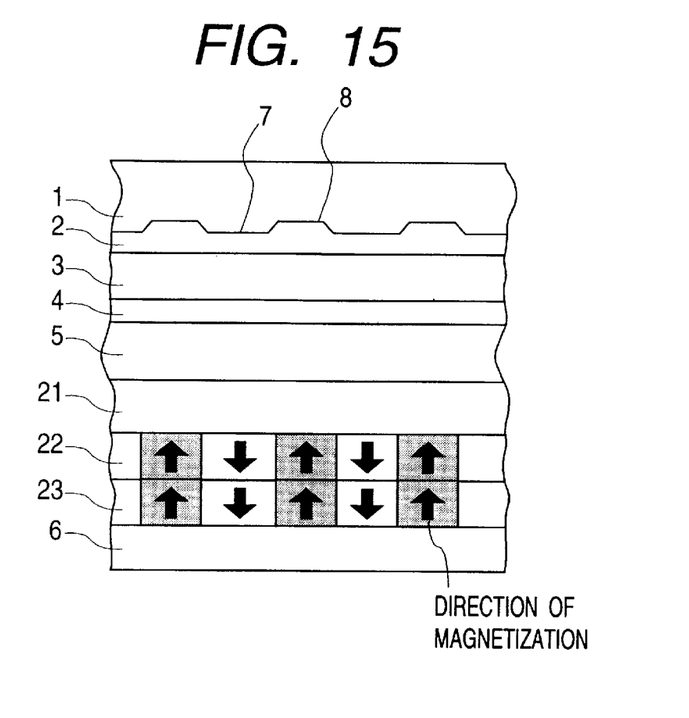
FIG. 15 is a sectional view of a magneto-optical recording medium according to the sixth embodiment of the present invention.

In order to obtain the effect of the present invention in this medium, the magnetization of the initialization layer is set to have opposite directions on lands and grooves, as shown in FIG. 15. The processing of the initialization layer can be performed in substantially the same procedure as described in the first embodiment. However, since the initialization layer normally has a strongest coercive force among all the magnetic layers, and is set to have a high Curie temperature, the medium must be set at a higher temperature than in the normal recording conditions, and power at least higher than Pl must be irradiated in a DC manner. Also, the strength of an external magnetic field is set to be higher than that in the normal recording conditions. Since this medium processing is also required only once after the disc is manufactured as in the first embodiment, even when the power and magnetic field that exceed the specifications of a normal recording/reproduction apparatus are required, or even when initialization processing is performed by preparing a special-purpose jig upon delivery from a factory, no problem is posed. Rather, processing is preferably performed using a special-purpose jig) since a trouble due to an operation error during an actual use can then be prevented.

Since the initialization layer has a higher Curie temperature and a larger coercive force than those of other layers, the magnetization of the memory layer aligns along that of the initialization layer upon execution of the above-mentioned initialization layer processing. For this reason, no operation for forcibly aligning the magnetization of the memory layer is required after the initialization layer processing.

When information recording is performed on both lands and grooves in this medium, the direction of the external magnetic field need only be reversed depending on the recording position, i.e., a land or groove, and the subsequent operation can be performed according to a normal recording operation, thus always attaining information recording, as shown in FIG. 15.

As described above, using the magneto-optical recording medium of the present invention, the magnetostatic coupling force between the magnetic layers can be increased, and information reproduction that has high signal quality and is stable against an external magnetic field can be realized. By modifying the film arrangement, very small marks can be reproduced, and the recording capacity of the information recording medium can be increased.

What is claimed is:

1. A magneto-optical recording medium, comprising at least a reproduction layer and a memory layer laminated on a substrate on which a groove and a land are formed, said reproduction layer and said memory layer being magnetostatically coupled to each other wherein said recording medium is so initialized prior to information recording that magnetization of said memory layer on the land is oriented in one direction, and magnetization of said memory layer on the groove is oriented in an opposite direction to the one direction.

2. A medium according to claim 1, wherein an intermediate layer consisting of a dielectric is arranged between said reproduction layer and said memory layer.

3. A medium according to claim 1, wherein said reproduction layer is in an in-plane magnetization state at room temperature, and becomes a perpendicular magnetization state at a temperature between room temperature and a Curie temperature thereof.

4. A medium according to claim 1, wherein once information is recorded on the land, following initialization of said medium, the magnetization of said entire memory layer on blank portions of the land uniformly is oriented in one direction, and magnetization of said entire memory layer on the groove uniformly is oriented in a direction opposite to the one direction.

5. A medium according to claim 1, wherein once information is recorded on the land and the groove, following initialization of said medium, the magnetization of said entire memory layer on blank portions of the land uniformly is oriented in one direction, and magnetization of said entire memory layer on blank portions of the groove uniformly is oriented in a direction opposite to the one direction.

6. A medium according to claim 1, wherein said medium additionally comprises an initialization layer, such that said medium is laminated on the substrate in this order—said reproduction layer, said memory layer, and said initialization layer, wherein the magnetization of said initialization layer is set to be in opposite directions on the land and the groove, and wherein the magnetization of said memory layer is initialized by aligning itself along the magnetization of said initialization layer.

7. A magneto-optical recording medium having lands and grooves and comprising at least a reproduction layer, a memory layer, and an initialization layer laminated on a substrate in this order—said reproduction layer, said memory layer and said initialization layer, said reproduction layer and said memory layer being magnetostatically coupled to each other, wherein the magnetization of said initialization layer is in opposite directions on the lands and the grooves, and wherein the magnetization of said memory layer aligns itself along the magnetization of said initialization layer.

8. A magneto-optical recording medium comprising at least a reproduction layer and a memory layer laminated on a substrate, said reproduction layer and said memory layer being magnetostatically coupled to each other, wherein said recording medium is so initialized prior to information recording that magnetizations of a first portion of said memory layer, where information is to be recorded, and a second portion of said memory layer that is adjacent to the first portion, are oriented in opposite directions, wherein, during initialization of said recording medium, the direction of an external magnetic field is set to be in one direction along the first portion, and the external magnetic field is set to be in a direction opposite to the one direction along the second portion.

9. A medium, according to any one of claims 1, 4–7 or 8 wherein said recording medium is so initialized that the magnetization of said memory layer is perpendicular to the substrate.

* * * * *